(12) United States Patent
Hsieh et al.

(10) Patent No.: US 10,161,480 B2
(45) Date of Patent: Dec. 25, 2018

(54) ECCENTRIC OSCILLATING SPEED REDUCER

(71) Applicant: INDUSTRIAL TECHNOLOGY RESEARCH INSTITUTE, Hsinchu (TW)

(72) Inventors: Chang-Chia Hsieh, Hsinchu (TW); Pei-Shan Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/688,349

(22) Filed: Aug. 28, 2017

(65) Prior Publication Data

US 2018/0187752 A1 Jul. 5, 2018

(30) Foreign Application Priority Data

Dec. 29, 2016 (TW) .............................. 105143909 A

(51) Int. Cl.
*F16H 1/32* (2006.01)

(52) U.S. Cl.
CPC ......... *F16H 1/32* (2013.01); *F16H 2001/323* (2013.01)

(58) Field of Classification Search
CPC ........................................................ F16H 1/32
See application file for complete search history.

(56) References Cited

U.S. PATENT DOCUMENTS

| 4,487,091 A | 12/1984 | Pierrat |
| 5,123,882 A | 6/1992 | Baranyi |
| 5,322,485 A | 6/1994 | Haga |
| 6,231,469 B1 | 5/2001 | Wang et al. |
| 7,935,017 B2 | 5/2011 | Kurita et al. |

(Continued)

FOREIGN PATENT DOCUMENTS

| CN | 101251166 A | 8/2008 |
| CN | 101294615 A | 10/2008 |

(Continued)

OTHER PUBLICATIONS

Litvin et al., Computerized design and generation of cycloidal gearings, Mechanism and Machine Theory, 1996, vol. 31, No. 7, pp. 891-911.

(Continued)

*Primary Examiner* — Derek D Knight
(74) *Attorney, Agent, or Firm* — Rabin & Berdo, P.C.

(57) ABSTRACT

An eccentric oscillating speed reducer includes: first and second external gears, each having shaft penetration holes in respective circumferences thereof; eccentric shafts, having first and second crank portions passing through the shaft penetration holes, with the first and second external gears furnished on the first and second crank portions, respectively; a supporting member inserted through a first shaft penetration hole of the first external gear and a second shaft penetration hole of the second external gear, and being in eccentric contact with inner peripheries of the shaft penetration holes; first and second output portions, each having shaft penetration holes on respective circumferences thereof, with both ends of an axis of each of the eccentric shafts furnished in the shaft penetration holes, and the first and second output portion being connected by the supporting member; and an annular gear engaged with the first and second external gears.

18 Claims, 8 Drawing Sheets

(56) References Cited

U.S. PATENT DOCUMENTS

| | | |
|---|---|---|
| 8,337,355 B2 | 12/2012 | Akami |
| 2013/0023374 A1 | 1/2013 | Ishikawa et al. |
| 2014/0228161 A1 | 8/2014 | Akiyoshi et al. |

FOREIGN PATENT DOCUMENTS

| | | |
|---|---|---|
| CN | 101328953 A | 12/2008 |
| CN | 101368612 A | 2/2009 |
| CN | 101375083 A | 2/2009 |
| CN | 102011858 A | 4/2011 |
| CN | 104948674 A | 9/2015 |
| EP | 0548888 A3 | 9/1993 |
| JP | 5069650 B2 | 11/2012 |
| TW | I352172 B | 11/2011 |
| TW | 201420920 A | 6/2014 |
| TW | I439620 B | 6/2014 |

OTHER PUBLICATIONS

Lin et al., Design of a two-stage cycloidal gear reducer with tooth modifications, Mechanism and Machine Theory, 2014, pp. 184-197.

Lai et al., Geometrical Design of Roller Drives with Two-Tooth Difference, Journal of the Chinese Society of Mechanical Engineers, Transactions of the Chinese Institute of Engineers, 2007, vol. 28, No. 6, pp. 641-648.

Tsai et al., Loaded Tooth Contact Analysis of Cycloid Planetary Gear Drives, The 14th IFToMM World Congress, Taipei, Taiwan, Oct. 25-30, 2015.

Thube et al., The Dynamic Simulation and Analysis of a Cycloidal Speed Reducer, Proceedings of the 11th ASME International Power Transmission and Gearing Conference, Aug. 28-31, 2011.

Do et al., Review on contact simulation of beveloid and cycloid gears and application of a modern approach to treat deformations, Mathematical and Computer Modelling of Dynamical Systems, 2015, vol. 21, No. 4, pp. 359-388.

ECCENTRIC OSCILLATING SPEED REDUCER

BACKGROUND

1. Technical Field

The present disclosure relates to eccentric oscillating speed reducing mechanisms, and, more particularly, to an eccentric oscillating speed reducer that increases radial and axial rigidity and life time of bearings.

2. Description of Related Art

Speed reducer is a power transmission mechanism, which converts the motor speed to a more desirable operating speed through the combination of several gears, thereby achieving deceleration and multiplying the amount of torque. Among the mechanics currently used in the transmission of power and motion, cycloid reducer is mainly used in industries where high-precision locations are required, such as the industrial robots, semiconductor manufacturing, precision packaging machinery and etc.

As shown in FIGS. 1A and 1B, an eccentric oscillating speed reducer of the prior art is shown. The eccentric oscillating speed reducer operates in a manner such that gear on a motor input shaft (not shown in FIG. 1A) drive a plurality of transmission gears 100 in the speed reducer. The axes of the plurality of transmission gears 100 are connected to respective end portions 200a of a plurality of eccentric shafts 200. The plurality of eccentric shafts 200 pass through shaft penetration holes 3011 and 3021 on the circumferences of external gears 301 and 302. Each of the eccentric shafts 200 has two crank portions 201 and 202 that are offset in opposite directions from the axes. The two external gears 301 and 302 are furnished on the two crank portions 201 and 202, respectively, and are engaged with cylinders 410 on an annular gear 400.

An output portion 500 is composed of two plates 501 and 502, and is coaxial with the annular gear 400. The two plates 501 and 502 are located on the periphery of the external gears 301 and 302, respectively. Angular contact ball bearings 401 are furnished between the two plates 501 and 502 and the annular gear 400. The two plates 501 and 502 are fastened to each other by bolts (not shown in FIG. 1A). There are a plurality of axial penetration holes 500a and 500b on the two plates 501 and 502. Both ends 200b and 200c of the eccentric shafts 200 are furnished in the plurality of axial penetration holes 500a and 500b, respectively. Tapered roller bearings 600 are furnished in the plurality of axial penetration holes 500a and 500b. The output portion 500 is not in contact with the external gears 301 and 302. Support pillars 1000 passing through the external gears 301 and 302 are not in contact with support penetration holes 3012 and 3022 of the two external gears 301 and 302, either.

In the above structure, when the annular gear 400 is stationary and the eccentric shafts 200 rotate one full circle, the eccentric shafts 200 drive the external gears 301 and 302 into motion. There is a difference between the numbers of teeth of the external gears 301 and 302 and the number of teeth of the annular gear 400. For example, the difference between the numbers of teeth is 1. Due to the constraint enforced by the annular gear 400 upon the external gears 301 and 302, the external gears 301 and 302 start to offset one tooth from the original point. In other words, the external gears 301 and 302 revolve around the axis of the annular gear 400, and self-rotate around the axes of the eccentric shafts 200. The high-torque rotational motion generated as a result of reduction in speed is delivered to the output portion 500 via the eccentric shafts 200. Complex forces and high-torque output are applied to the eccentric shafts 200 during operation.

As shown in FIG. 1C, F1 and F2 are the forces the eccentric shafts 200 exerted upon the external gears 301 and 302, respectively. $F1_x$ and $F2_x$ are X direction of the forces on the external gears 301 and 302, respectively; $F1_y$ and $F2_y$ are Y direction of the forces on the external gears 301 and 302. $R_A$ and $R_B$ are the forces the eccentric shafts 200 exerted upon the output portion 500, i.e., $R_{AH}$ and $R_{AV}$ are the forces the eccentric shafts 200 exerted upon the plate 501, and $R_{BH}$ and $R_{BV}$ are the forces the eccentric shafts 200 exerted upon the plate 502. When delivering high torque under high speed reduction, the eccentric shafts 200 tend to bent and get distorted, and fatigue damage may occur.

SUMMARY

The present disclosure provides an eccentric oscillating speed reducer, which may include: a first external gear including a plurality of first axial penetration holes on a first circumference thereof; a second external gear including a plurality of second axial penetration holes on a second circumference thereof; a plurality of eccentric shafts including first crank portions and second crank portions passing through the corresponding first axial penetration holes of the first external gear and the corresponding second axial penetration holes of the second external gear, wherein the first external gear is furnished on the first crank portions of the eccentric shafts and the second external gear is furnished on the second crank portions of the eccentric shafts; at least a supporting member penetrating through a first support penetration hole of the first external gear and a second support penetration hole of the second external gear, and contacting eccentrically with inner peripheries of the penetration holes; a first output portion and a second output portion connected via the at least a supporting member and including a plurality of third axial penetration holes on respective circumferences thereof, both ends of the eccentric shafts being furnished in the plurality of third axial penetration holes; and an annular gear engaged with the first and the second external gears.

The present disclosure further provides an eccentric oscillating speed reducer, which may include: a first external gear including a plurality of first axial penetration holes on a first circumference thereof; a second external gear including a plurality of second axial penetration holes on a second circumference thereof; a plurality of eccentric shafts including first crank portions and second crank portions passing through the corresponding first axial penetration holes of the first external gear and the corresponding second axial penetration holes of the second external gear, wherein the first external gear is furnished on the first crank portions of the eccentric shafts and the second external gear is furnished on the second crank portions of the eccentric shafts; a first output portion and a second output portion including a plurality of third axial penetration holes on respective circumferences thereof, both ends of the eccentric shafts being furnished in the plurality of third axial penetration holes, wherein axial-support rolling bearings and radial-support rolling bearings are furnished between the eccentric shafts and the first and the second output portions; and an annular gear engaged with the first and the second external gears.

DETAILED DESCRIPTION

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

Figure 1A:
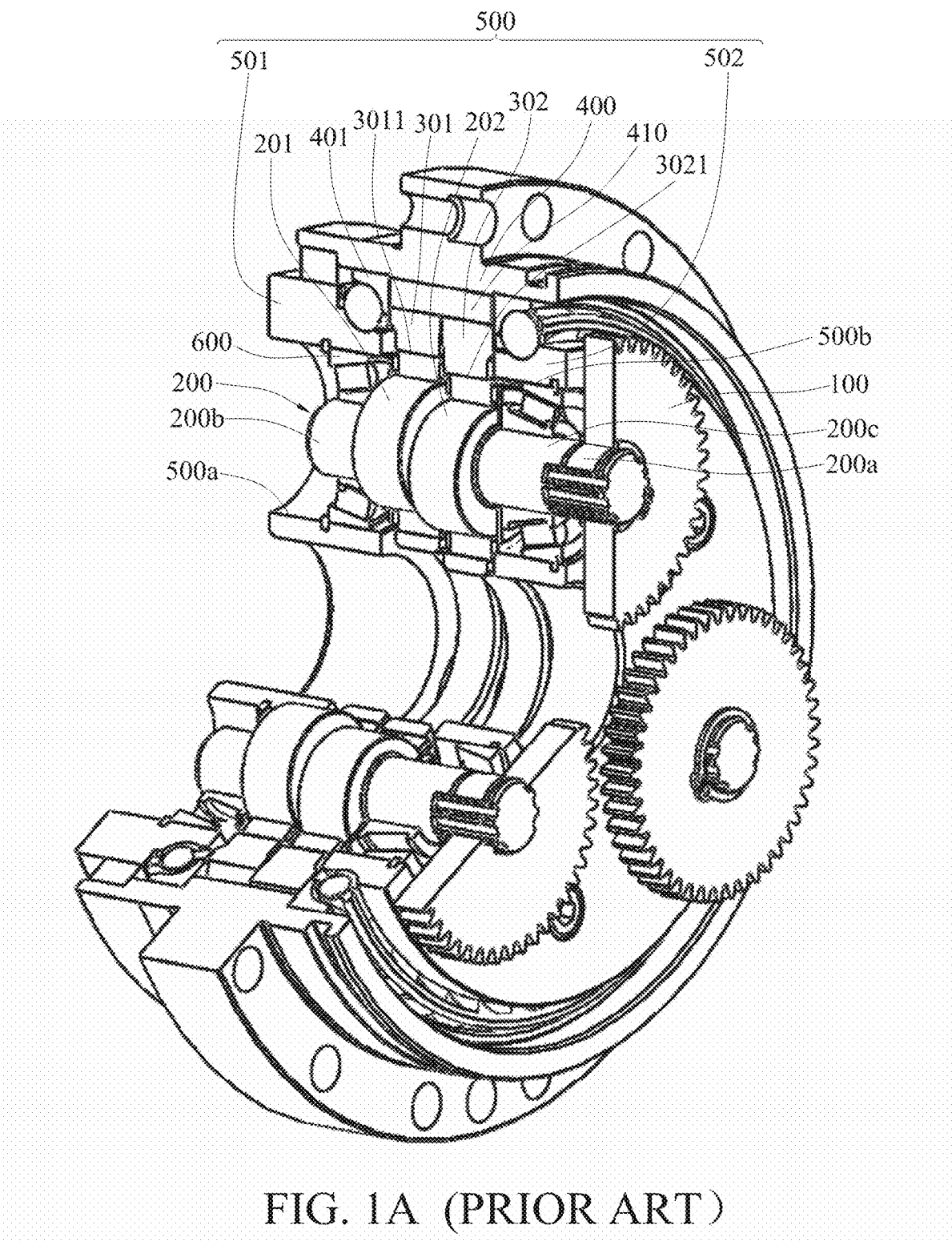
FIGS. 1A to 1C are schematic diagrams illustrating an eccentric oscillating speed reducer of the prior art and forces imposed thereon.
Figure 1B:
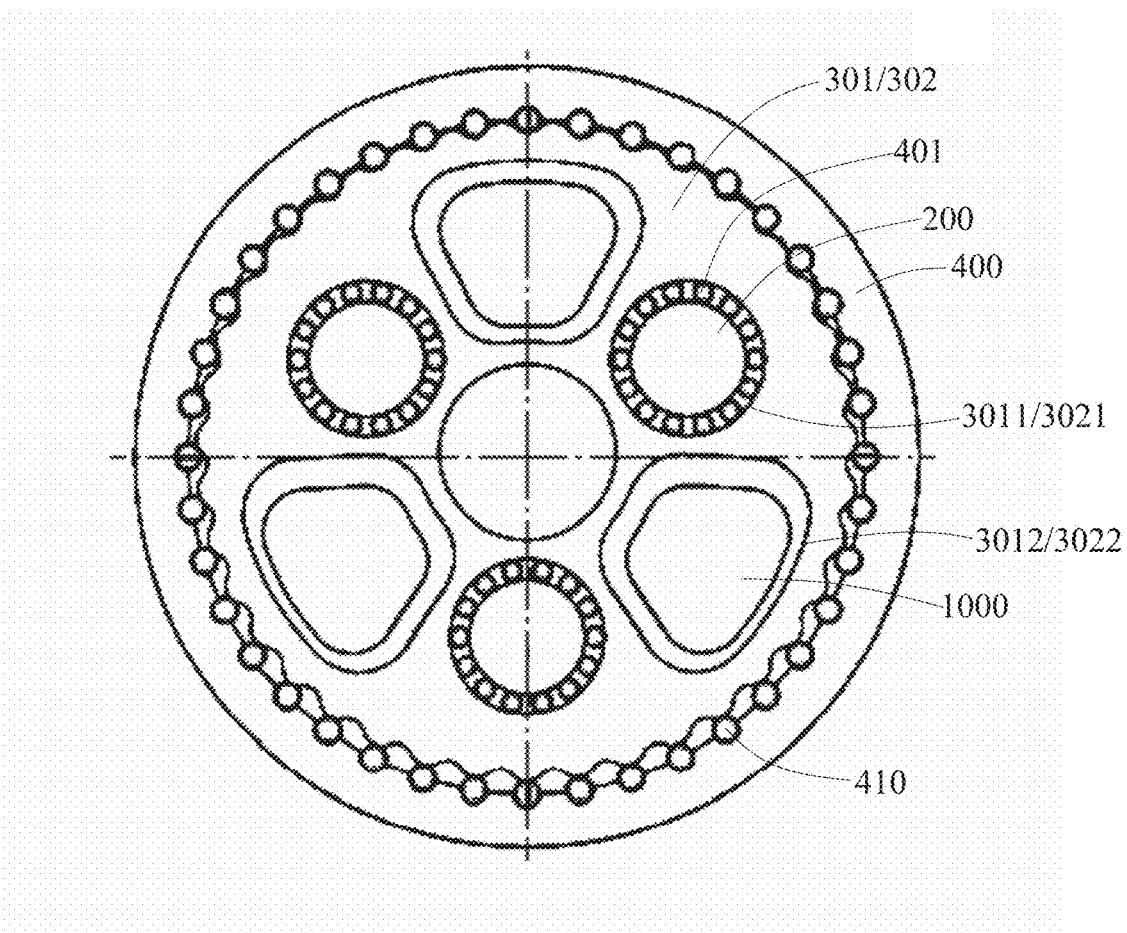
Figure 1C:
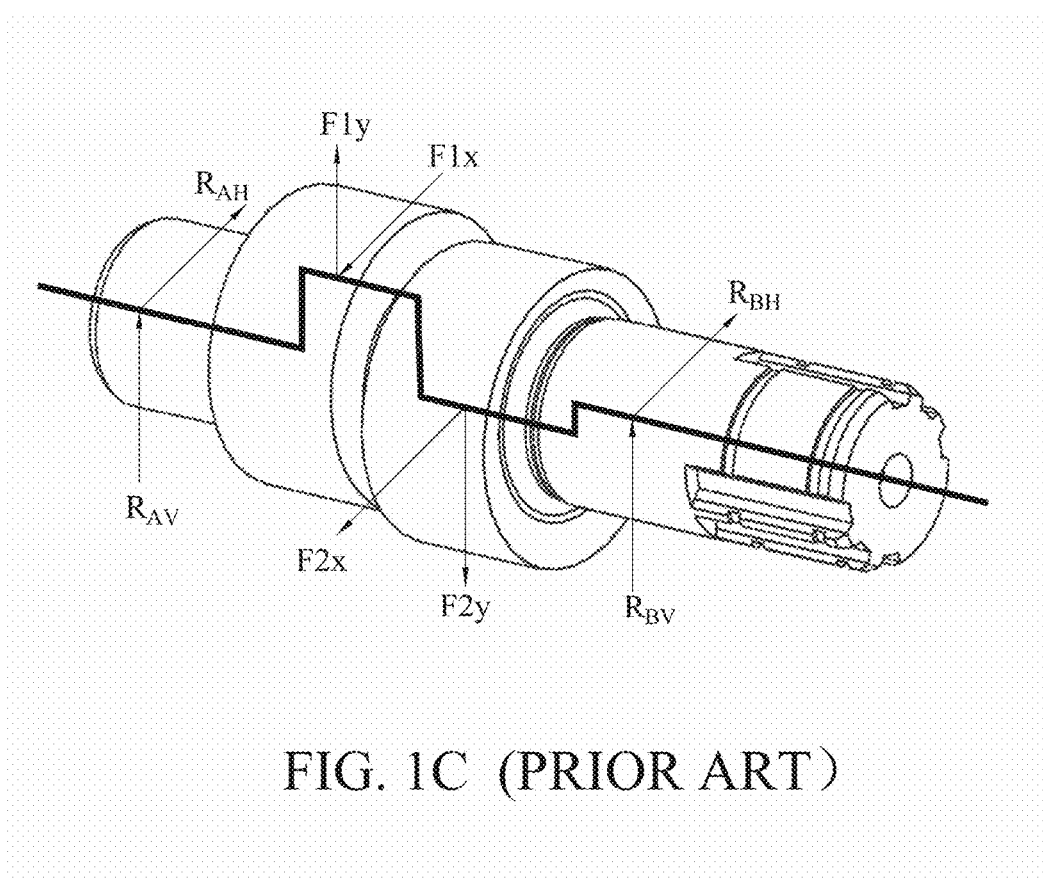
Figure 2:
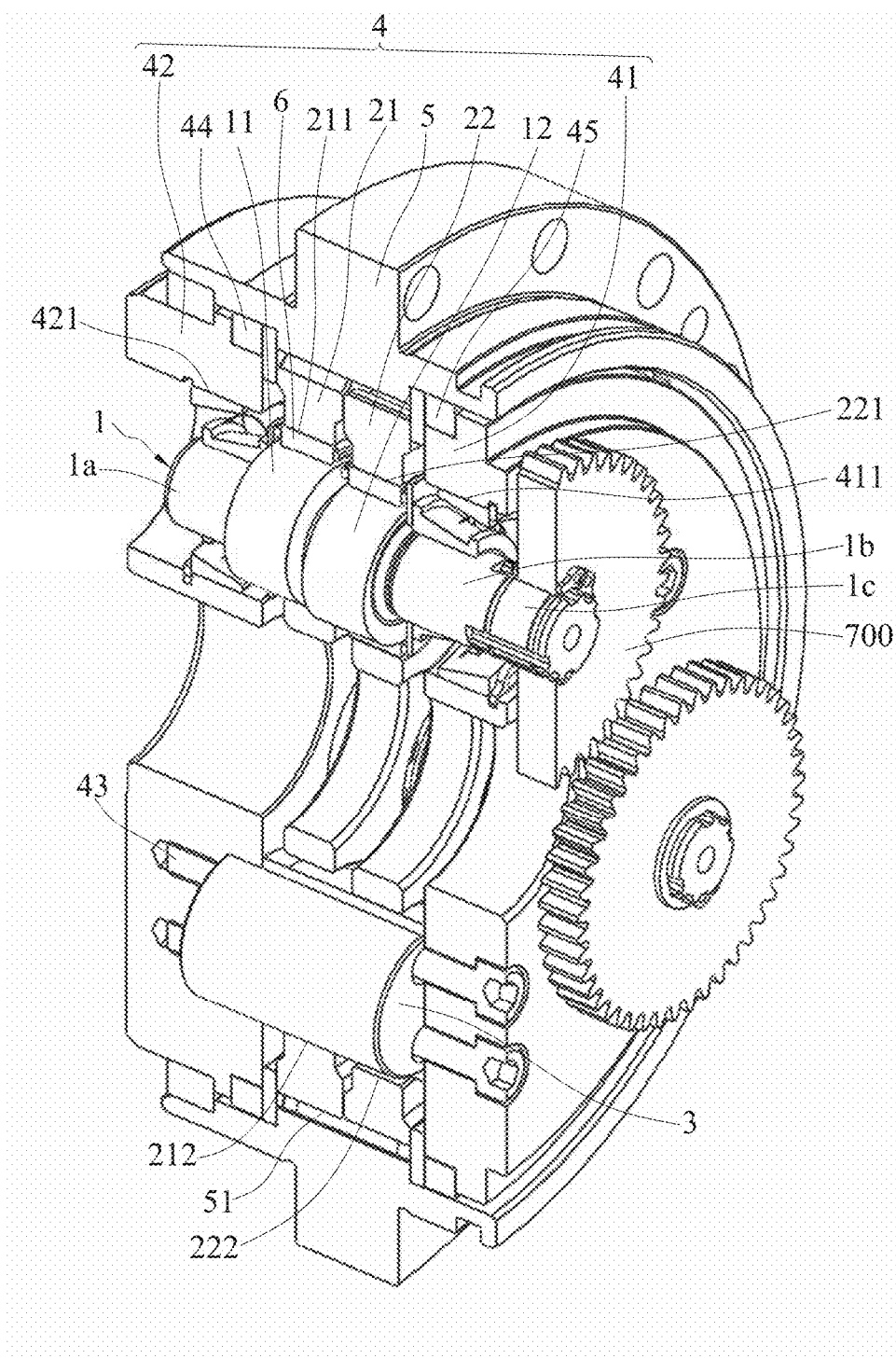
FIG. 2 is a perspective cross-sectional view of an eccentric oscillating speed reducer in accordance with an embodiment of the present disclosure.
Figure 3:
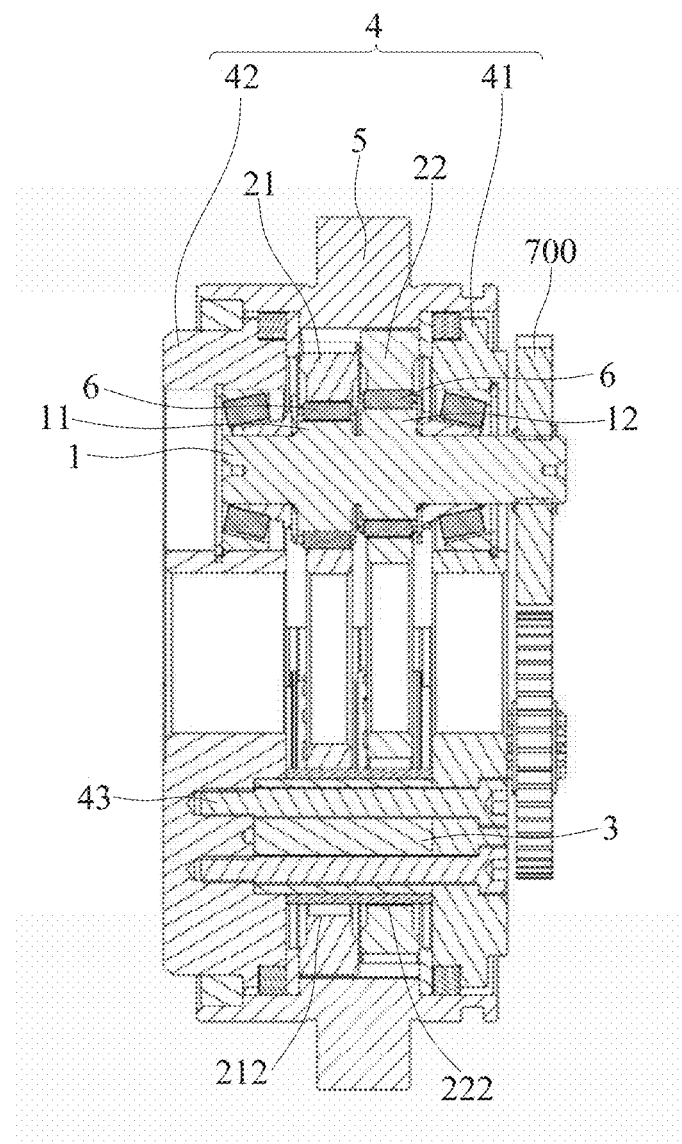
FIG. 3 is a planar cross-sectional view of an eccentric oscillating speed reducer in accordance with an embodiment of the present disclosure.

Referring to FIGS. 2 and 3, a perspective cross-sectional view and a planar cross-sectional view of an eccentric oscillating speed reducer in accordance with an embodiment of the present disclosure are shown, respectively. As shown, the eccentric oscillating speed reducer includes an eccentric shaft 1, a first external gear 21, a second external gear 22, at least a supporting member 3, an output portion 4 and an annular gear 5.

The eccentric shaft 1 has a first crank portion 11 and a second crank portion 12 that are offset the same distance from the axis of the eccentric shaft 1 in opposite direction. In order to have a symmetrical structure, there are at least two of the eccentric shafts 1. In an embodiment, there are three eccentric shafts 1. The eccentric shafts 1 pass through first axial penetration holes 211 and second axial penetration holes 221 distributed evenly on the circumferences of the first external gear 21 and the second external gear 22, respectively. The first external gear 21 and the second external gear 22 are stacked in parallel on the first crank portion 11 and the second crank portion 12, respectively, and are furnished in the annular gear 5. Roller bearings 6 are furnished between the first crank portion 11 and the first axial penetration hole 211, and between the second crank portion 12 and the second axial penetration hole 221. When the eccentric shaft 1 rotates, the friction between the first crank portion 11 and the first axial penetration holes 211 and between the second crank portion 12 and the second axial penetration holes 221 can be reduced. A transmission gear 700 is connected at an end 1c of the axial end portion of the eccentric shaft 1.

A plurality of cylinders 51 are furnished on the inner peripheral edge of the annular gear 5. The first external gear 21 and the second external gear 22 are engaged with the plurality of cylinders 51. The output portion 4 is composed of a first output portion 41 and a second output portion 42, which are furnished at the outer side of the first external gear 21 and the second external gear 22, respectively. The output portion 4 is coaxial with the annular gear 5. The first output portion 41 and the second output portion 42 include a plurality of axial penetration holes 411 and 421 on the respective circumferences thereof, respectively. Both ends 1a and 1b along the axis of the eccentric shaft 1 are penetrating through the axial penetration holes 421 and 411, respectively.

The at least a supporting member 3 penetrates through a first support penetration hole 212 of the first external gear 21 and a second support penetration hole 222 of the second external gear 22. In an embodiment, there are three supporting members 3, and they are evenly distributed on the circumference of the output portion 4. The supporting members 3 are fastened to the first output portion 41 and second output portion 42 by a plurality of bolts 43 or nuts.

The at least a supporting member 3 penetrates through a first support penetration hole 212 on the circumference of the first external gear 21 and a second support penetration hole 222 on the circumference of the second external gear 22. In an embodiment, the diameters of the circumferences of the first and second axial penetration holes 211 and 221 are equal to the diameters of the circumferences of the first and second support penetration holes 212 and 222. The supporting member 3 may be a cylinder. The difference between the diameter of the supporting member 3 and the diameter of the first and second support penetration holes 212 and 222 may be twice as long as the eccentricity of the eccentric shaft 1. The supporting member 3 contacts eccentrically with the inner peripheries of the first support penetration hole 212 and the second support penetration hole 222, so as to share the radial force and high torque with the eccentric shafts 1. This helps to extend the life time of the eccentric shafts 1.

In addition, the plurality of cylinders 51 are furnished on the annular gear 5. The annular gear 5 is engaged with the first external gear 21 and the second external gear 22 via the plurality of cylinders 51. Cross rollers 44 and 45 are furnished between the output portion 4 (the first output portion 41 and the second output portion 42) and the annular gear 5, forming a rolling relationship. Involute gears, cycloidal gears or other types of gears can also be used as the annular gear 5, the first external gear 21 and the second external gear 22. The cylinders 51 can also be omitted, and the annular gear 5 is directly engaged with the first external gear 21 and the second external gear 22.

Figure 4:
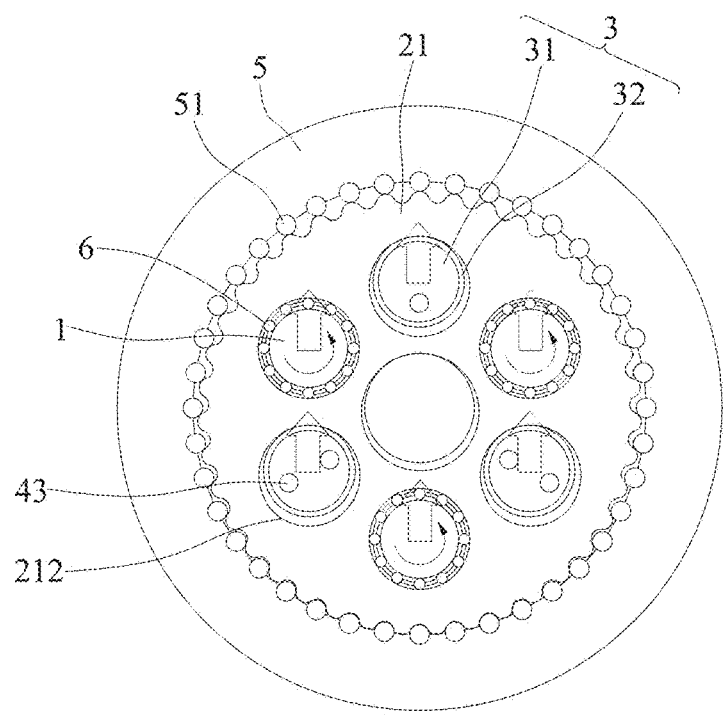
FIG. 4 is a schematic diagram illustrating forces imposed on supporting members in the eccentric oscillating speed reducer of the present disclosure when being in contact with penetration hole.

Referring to FIG. 4, the supporting members 3 in the eccentric oscillating speed reducer of the present disclosure are in contact with the penetration holes on the circumferences of the external gears 21 and 22. Referring in conjunction with FIG. 3, when the annular gear 5 is stationary, a motor drives a central gear shaft (not shown) to rotate clockwise, which drives the three transmission gears (e.g., the transmission gear 700 in FIG. 3) to rotate. Power is transmitted to the eccentric shafts 1, such that the eccentric shafts 1 revolve around the axis of the annular gear 5 while rotating anticlockwise themselves. At the same time, the external gears on the crankshafts of the eccentric shaft 1

(e.g., the first external gear 21 and the second external gear 22 in FIG. 3, but only the first external gear 21 can be seen in this diagram due to the cross-sectional perspective) oscillates eccentrically. As the external gears (the first external gear 21 and the second external gear 22) are engaged with the plurality of cylinders 51 in the annular gear 5, contact forces and torques will be created due to motion constraint imposed by the cylinders 51. According to Newton's third law of motion, the eccentric shafts 1 experience complex forces and high-torque output during rotation.

In an embodiment, three supporting members 3 are furnished relative to the three eccentric shafts 1. During operation of the eccentric oscillating speed reducer, these supporting members 3 maintain contact with the inner peripheries of the first support penetration hole 212 of the first external gear 21 (the second support penetration hole 222 of the second external gear 22), reducing the radial forces of the eccentric shafts 1 by half and thus extending the life time of the eccentric shafts 1.

In an embodiment, the supporting member 3 further includes a support pillar 31 and a bushing 32 surrounding the periphery of the support pillar 31. The bushing 32 is in rolling contact with the edges of the first support penetration hole 212 and the second support penetration hole 222 (refer to FIG. 3 for the relationships between the second external gear 22, the second support penetration hole 222 and the supporting member 3.) There are gaps between the support pillar 31, the bushing 32, and the first support penetration hole 212 (second support penetration hole 222) to allow lubricant to flow pass, reducing friction loss between the supporting member 3, the first external gear 21 and the second external gear 22.

Figure 5:
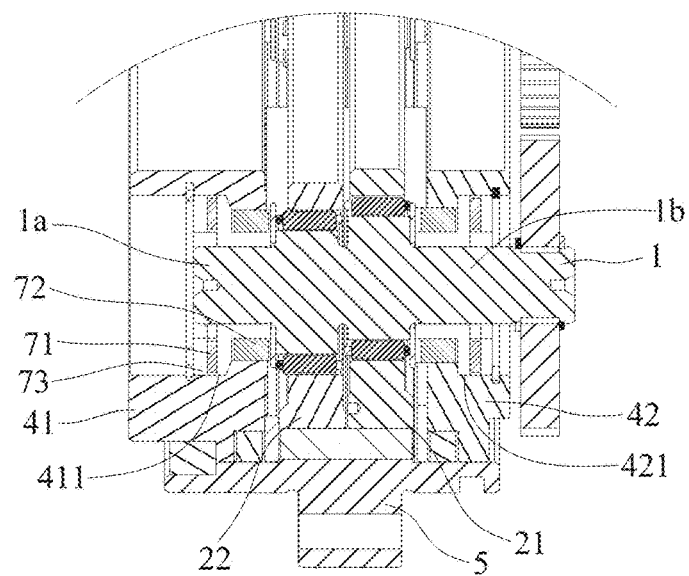
FIG. 5 is a schematic diagram illustrating a bearing structure of the eccentric oscillating speed reducer in accordance with a first embodiment of the present disclosure.

Referring to FIG. 5, a schematic diagram illustrating a bearing structure of the eccentric oscillating speed reducer in accordance with a first embodiment of the present disclosure is shown. The both ends 1a and 1b on the axis of the eccentric shaft 1 penetrate through the axial penetration holes 411 and 421, respectively. A composite bearing assembly (a first bearing 71 and a second bearing 72) is furnished between the end 1a and the axial penetration holes 411 and between the end 1b and the axial penetration hole 421. The first bearing 71 can be a thrust ball bearing or a thrust roller bearing for supporting an axial load. The second bearing 72 can be a roller bearing for supporting a radial load. The first bearings 71 are positioned between the axial penetration holes 411 and 421 via retaining rings 73 or nuts.

Figure 6:
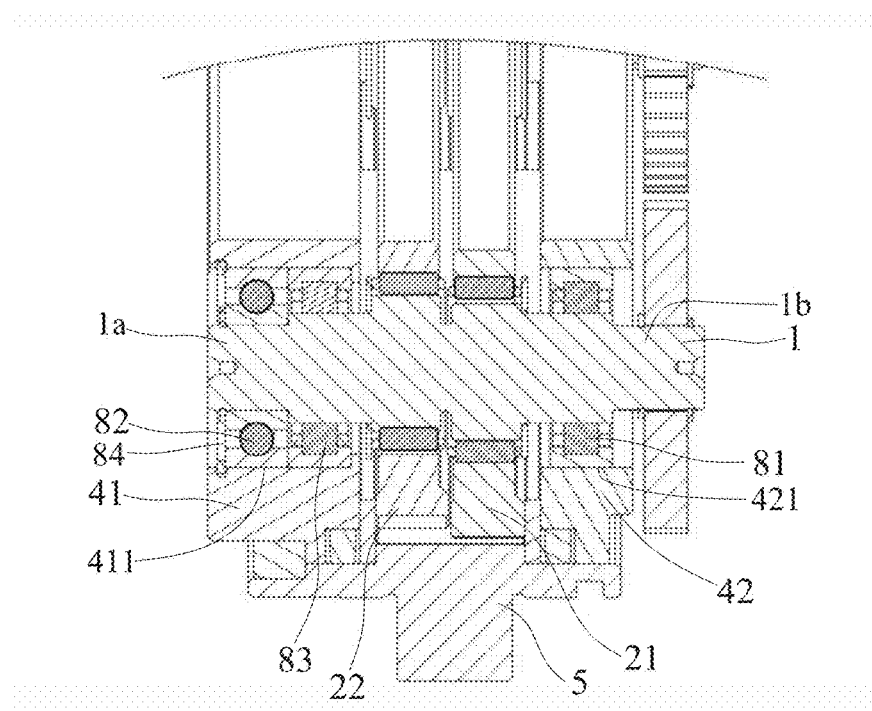
FIG. 6 is a schematic diagram illustrating a bearing structure of the eccentric oscillating speed reducer in accordance with a second embodiment of the present disclosure.

Referring to FIG. 6, a schematic diagram illustrating a bearing structure of the eccentric oscillating speed reducer in accordance with a second embodiment of the present disclosure is shown. As the axial space in the second output portion 42 is small, only a first roller bearing 81 is furnished between the ends 1b and the axial penetration holes 421 for supporting a radial load. On the other hand, a ball bearing 82 and a second roller bearing 83 are furnished between the other ends 1a and the axial penetration holes 411 for supporting both radial and axial load. The ball bearing 82 that supports both radial and axial loads can be a four-point contact ball bearing or a deep groove ball bearing. The ball bearings 82 and the second roller bearings 83 at the side of the axial penetration holes 411 are positioned in the respective axial penetration holes 411 via retaining rings 84 or nuts.

It can be seen from the above that the first roller bearing 81 is between the eccentric shaft 1 and the second output portion 42, and a four-point contact ball bearing and the second roller bearing 83 or a deep-groove ball bearing and the second roller bearing 83 are between the eccentric shaft 1 and the first output portion 41.

Compared to the tapered roller bearings of the prior art, the roller bearings according to the present disclosure support a greater radial load and increase the effective duration, and the bearing assembly increases both radial and axial rigidity.

Figure 7:
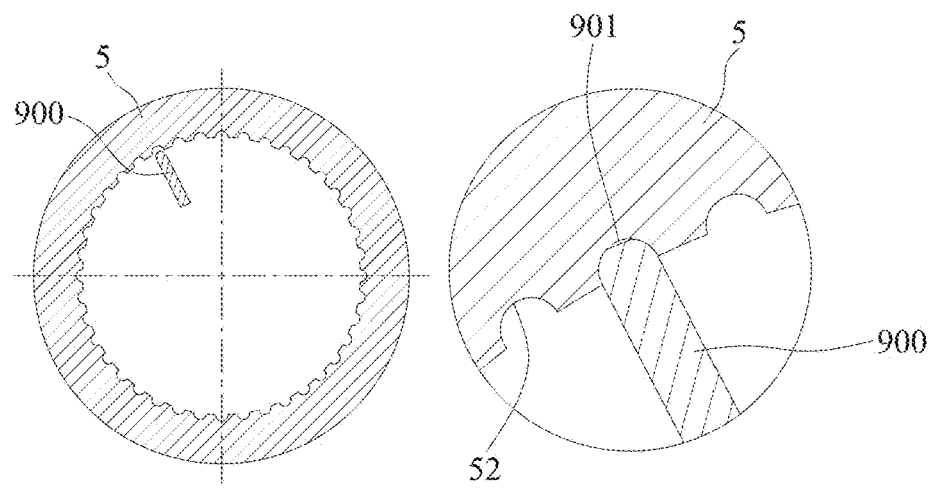
FIG. 7 is a schematic diagram illustrating a groove processing performed by an existing grinding wheel.

Typically, grooves 52 of the annular gear 5 are polished by a grinding wheel 900 during manufacturing process as shown in FIG. 7. However, grains on the grinding wheel 900 lose their edges and break due to the wheel wear, resulting in an undesirable shape of the front edge 901 of the grinding wheel 900. As a result, the teeth profiles of the annular gear 5 after processing are not as desired, causing errors in the locations of the cylinders 51 in the grooves 52 of the annular gear 5. In this situation, there may be unanticipated interferences or gaps between the first external gear 21, the second external gear 22 and the cylinders 51. Noises or unsmooth operations will occur in the speed reducer. The dressing process is often required to reestablish the surface of the front edge 901 of the grinding wheel 900.

In view of this, the present disclosure further proposes a depression 53 (shown in FIGS. 9A and 9B) at the bottom of the groove 52. The curvatures at where the groove 52 and the depression 53 connects and any arbitrary point of the depression 53 are finite values. Any corner (including other sharp shapes) profiles consisting of right angles and acute angles between the groove 52 and the depression 53 can be avoided, and the depression 53 has a smooth curved surface. Even when a cylinder 51 contact with the bottom of the groove 52 of the annular gear 5 due to elastic deformation, stress concentration will not occur.

Figure 8:
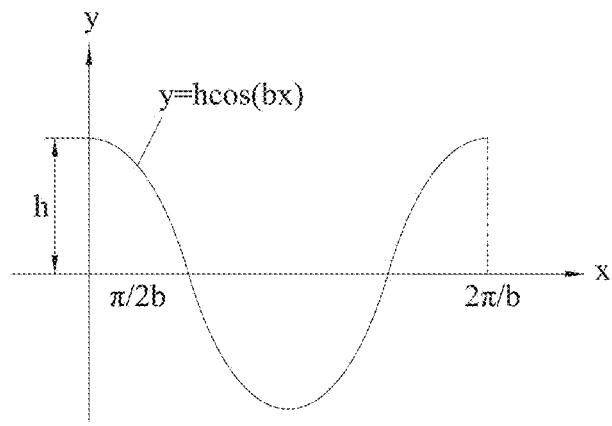
FIG. 8 is a cosine curve used as the profile of a depression in the present disclosure.
Figure 9A:
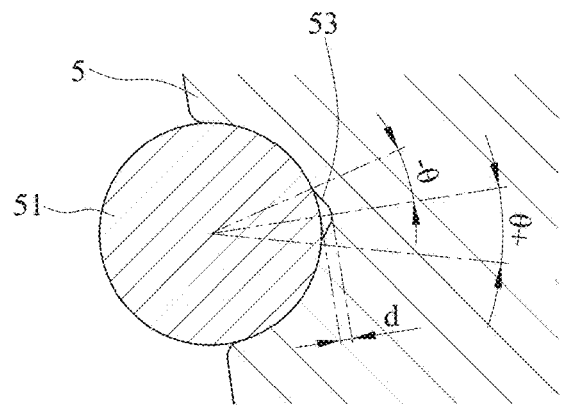
FIGS. 9A and 9B are schematic diagrams depicting enlarged depressions in accordance with different embodiments of the present disclosure.

Referring to FIG. 9A, a schematic diagram depicting an enlarged depression 53 in accordance with an embodiment of the present disclosure is shown. In a $\pm\theta$ range from the center of the groove, a complete period of cosine curve shown in FIG. 8 is used as the profile of the depression, in which twice the amplitude (h) is the depth of the depression.

Figure 9B:
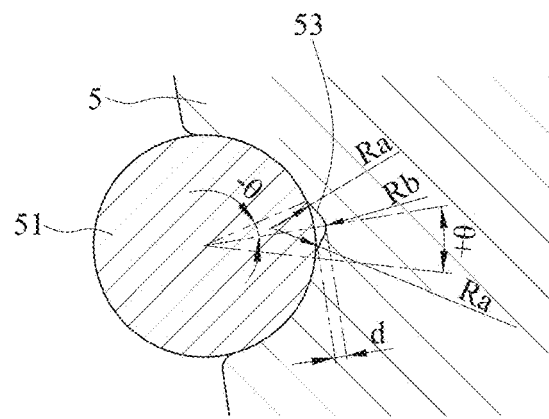

Moreover, as shown in FIG. 9B, a schematic diagram depicting an enlarged depression 53 in accordance with another embodiment of the present disclosure is shown. In an embodiment, an arc curve is used as the profile of the depression. Ra represents the radius of curvature at a location where the edge of the depression 53 and the groove 52 of the annular gear 5 meets, and Rb represents the radius of curvature of the depression 53. In an implementation, the range of angle of the depression 53 can be within $\pm15°$, and the range of depth d can be within 10% of the diameter of the cylinder 51. However, the present disclosure is not limited to the above implementation.

As the depressions 53 of the annular gear 5 do not affect the engaging between the first external gear 21, the second external gear 22 and the plurality of cylinders 51. Unanticipated interferences or gaps between the first external gear 21, the second external gear 22 and the cylinders 51 due to error in teeth manufacturing process can be eliminated. In addition, the depression 53 can be used for lubricant to flow pass, reducing friction loss and vibrations, and increasing precision and effective duration of the eccentric oscillating speed reducer.

In conclusion, the present disclosure provides an eccentric oscillating speed reducer, in which the supporting members 3 are used to connect the first output portion 41 and the second output portion 42, which are not only used for positioning and fastening, but also for sharing the contact forces and torques between the first external gear 21, the second external gear 22 and the eccentric shafts 1, reducing the load supported by the eccentric shafts 1. Furthermore, roller bearings are used in combination with bearings that support axial loads (e.g., thrust ball bearings, deep groove ball bearings, or four-point contact bearings) between the output portion 4 and the eccentric shafts 1. The roller bearings are used instead of the tapered roller bearings, thus avoiding the situation where the tapered roller bearings themselves create axial force components. Moreover, thrust ball bearings, deep-groove ball bearings, or four-point contact bearings are used to prevent axial movements of the eccentric shafts 1, thus reducing unsmooth operations due to distortions of the eccentric shafts 1 and also offering some support for axial loads. This greatly increases the capacity for radial loads, rigidity, and support for load torques, thereby extending the life time of the eccentric oscillating speed reducer.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. An eccentric oscillating speed reducer, comprising:
   a first external gear including a plurality of first axial penetration holes on a first circumference;
   a second external gear including a plurality of second axial penetration holes on a second circumference;
   a plurality of eccentric shafts including first crank portions and second crank portions passing through the corresponding first axial penetration holes of the first external gear and the corresponding second axial penetration holes of the second external gear, wherein the first external gear is furnished on the first crank portions of the eccentric shafts and the second external gear is furnished on the second crank portions of the eccentric shafts;
   at least a supporting member penetrating through a first support penetration hole of the first external gear and a second support penetration hole of the second external gear, wherein the at least a supporting member is in eccentric contact with inner peripheries of the first support penetration hole of the first external gear and the second support penetration hole of the second external gear;
   a first output portion and a second output portion including a plurality of axial penetration holes on the respective circumferences thereof, both ends of the eccentric shafts being furnished in the plurality of axial penetration holes; and
   an annular gear engaged with the first and the second external gears.

2. The eccentric oscillating speed reducer of claim 1, wherein the first output portion is connected to the second output portion through the at least a supporting member.

3. The eccentric oscillating speed reducer of claim 2, wherein the at least a supporting member further includes a bushing surrounding a periphery thereof.

4. The eccentric oscillating speed reducer of claim 3, wherein the bushing is in rolling contact with edges of the first support penetration hole of the first external gear and the second support penetration hole of the second external gear.

5. The eccentric oscillating speed reducer of claim 2, wherein the at least a supporting member is fastened to the first output portion and the second output portion via screws.

6. The eccentric oscillating speed reducer of claim 2, further comprising a first bearing assembly furnished between the first output portion and the eccentric shafts and a second bearing assembly furnished between the second output portion and the eccentric shafts.

7. The eccentric oscillating speed reducer of claim 6, wherein each of the first and second bearing assemblies includes a thrust bearing and a roller bearing.

8. The eccentric oscillating speed reducer of claim 1, wherein the annular gear is further furnished with a plurality of cylinders configured to roll inside grooves of the annular gear with depressions furnished at bottoms of the grooves.

9. The eccentric oscillating speed reducer of claim 8, wherein the depressions have a depth within 10% of a diameter of the cylinders.

10. The eccentric oscillating speed reducer of claim 8, wherein the depressions have an angle within ±15° from a center of any one of the bottoms of the grooves.

11. The eccentric oscillating speed reducer of claim 1, further comprising axial-support rolling bearings and radial-support rolling bearings furnished between the eccentric shafts and the first output portion and the second output portion.

12. The eccentric oscillating speed reducer of claim 11, wherein the axial-support rolling bearings are thrust bearings.

13. The eccentric oscillating speed reducer of claim 11, wherein the radial-support rolling bearings are roller bearings.

14. The eccentric oscillating speed reducer of claim 1, further comprising a four-point contact bearing and a first roller bearing furnished between the first output portion and the eccentric shafts.

15. The eccentric oscillating speed reducer of claim 14, further comprising a second roller bearing furnished between the second output portion and the eccentric shafts.

16. The eccentric oscillating speed reducer of claim 1, further comprising a deep-groove ball bearing and a first roller bearing furnished between the first output portion and the eccentric shafts.

17. The eccentric oscillating speed reducer of claim 16, further comprising a second roller bearing furnished between the second output portion and the eccentric shafts.

18. The eccentric oscillating speed reducer of claim 1, wherein rolling relationships and radial loads are formed between the first and second output portions and the annular gear via cross roller bearings.

* * * * *